(12) United States Patent
Kojima

(10) Patent No.: US 6,691,522 B1
(45) Date of Patent: Feb. 17, 2004

(54) CONTROLLER FOR VEHICLE AIR CONDITIONER

(75) Inventor: Hiraku Kojima, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 10/236,879

(22) Filed: Sep. 6, 2002

(51) Int. Cl.$^7$ ................................. B60H 1/32
(52) U.S. Cl. ................ 62/133; 62/323.4; 62/229; 62/209
(58) Field of Search ............. 62/133, 227, 229, 62/323.1, 323.4, 243, 244, 208, 209, 215, 228.1, 228.4, 228.5

(56) References Cited

U.S. PATENT DOCUMENTS 5,983,650 A * 11/1999 Ando et al. .................. 62/133
6,481,225 B2 * 11/2002 Kimura et al. ............... 62/133
6,484,520 B2 * 11/2002 Kawaguchi et al. .......... 62/133
6,601,395 B2 * 8/2003 Kotwicki et al. ............. 62/133

FOREIGN PATENT DOCUMENTS

JP   08-295131   11/1996   ............ B60H/1/32

* cited by examiner

Primary Examiner—Harry B. Tanner
(74) Attorney, Agent, or Firm—Darby & Darby

(57) ABSTRACT

A controller for a vehicle air conditioner which includes a control unit, a fuel cutoff control unit capable of stopping supply of fuel to an engine, an engine rpm detecting unit capable of detecting engine revolutions per minute, and a brake signal detecting unit capable of detecting a brake signal is provided. The control unit is adapted to alter the evaporator temperature setting during fuel cutoff, when a detected change of engine rpm is less than a predetermined value, and brake signal detector does not detect a brake signal.

6 Claims, 7 Drawing Sheets

CONTROLLER FOR VEHICLE AIR CONDITIONER

FIELD OF THE INVENTION

The present invention relates to a controller for a vehicle air conditioner, and more particularly to such a controller that adjusts the evaporator temperature setting depending on operating conditions.

BACKGROUND OF THE INVENTION

A vehicle air conditioner generally has an engine-driven compressor for compressing a coolant, a condenser, and an evaporator. Such an air conditioner is controlled by its on/off operation of the compressor. The on/off operation of the compressor is determined by both an evaporator blowoff temperature set value, which is responsive to the evaporator inlet temperature, etc., and the actual evaporator blowoff temperature. Thus, the compressor on/off operation is controlled independently of the engine operating status, except for certain conditions such as during quick acceleration, i.e., large throttle openings.

One example of a controller for a vehicle air conditioner is disclosed in Japanese Unexamined Patent Application Publication No. 8-295131. The air-conditioner, which is driven by an internal combustion engine, includes a compressor and an electromagnetic clutch. An electronic control unit (ECU) engages and disengages the electromagnetic clutch depending on the engine operating status, thereby controlling the operation of the air conditioner. The ECU also controls each fuel injector to cutoff fuel during engine deceleration. When executing fuel cutoff during engine deceleration, the ECU also disengages the electromagnetic clutch to disconnect the compressor from the engine, whereby the air conditioner is stopped and air conditioning operation is cut off. After the fuel cutoff operation, the ECU prevents the cutoff of the air conditioning operation for a predetermined period, i.e., air conditioning operation is enabled. As a result, satisfactory air conditioning is maintained without deteriorating fuel consumption during either deceleration of the internal combustion engine or a quick increase of load.

In the conventional air-conditioner, when the compressor is turned on in the coasting mode, deceleration increases and drivability worsens due to the draw of the compressor, particularly when a transmission device, such as an engine brake, is engaged.

Another disadvantage is that increased deceleration lowers vehicle speed more quickly and the driver must re-accelerate (via the accelerator pedal) more often, deteriorating, i.e., increasing, fuel consumption.

On the other hand, during braking when the transmission device and the compressor are engaged, the compressor is driven by and uses the kinetic energy of the vehicle, thereby assisting in braking. If the compressor is not engaged during braking, this kinetic energy would not be utilized but instead would be emitted as heat from the braking device. Thus, fuel consumed driving the compressor on subsequent acceleration would be greater than if the compressor had been engaged during braking, and overall fuel consumption is worsened.

SUMMARY OF THE INVENTION

The present invention provides a controller for a vehicle air conditioner. The air conditioner comprises an engine-driven compressor, a condenser, and an evaporator. The controller comprises a control unit adapted to control blow-off temperature according to an evaporator temperature setting calculated from an evaporator inlet temperature, a fuel cutoff control unit, an engine rpm detecting unit, and a brake signal detecting unit. The control unit is also adapted to decrease the evaporator temperature setting during fuel cutoff operation by the fuel cutoff control unit when a change of the engine rpm within a certain time period is less than a predetermined value, and when a brake signal is detected by the brake signal detecting unit and this signal is continued for a predetermined time.

By raising the evaporator temperature setting under these conditions, the time period for which the compressor is disengaged (stopped) increases. This reduces engine load and moderates vehicle deceleration. This also increases the duration of fuel cutoff and, thus, reduces fuel consumption.

The control unit may also lower the evaporator temperature setting during fuel cutoff operation under these same conditions which would allow the compressor to operate for a longer time and would increase engine braking during braking, thereby reducing the braking performed by the vehicle brakes and prolonging brake pad life. This would also decrease fuel consumption.

DETAILED DESCRIPTION OF THE INVENTION

The present invention will be described below in detail with reference to the drawings.

Figure 1A:
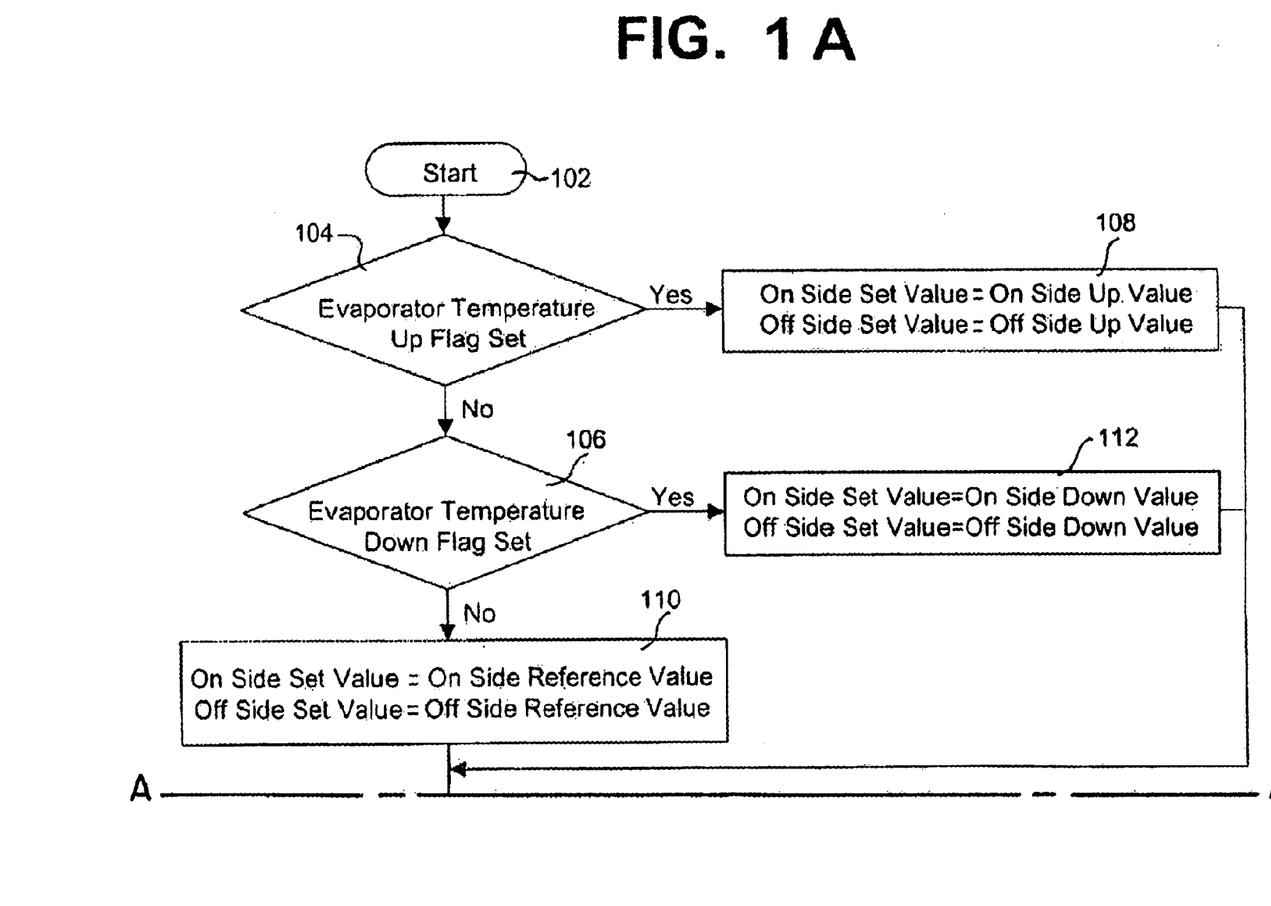
FIGS. 1A and 1B are a flowchart of a process for determining an evaporator temperature setting according to an embodiment of the present invention.
Figure 1B:
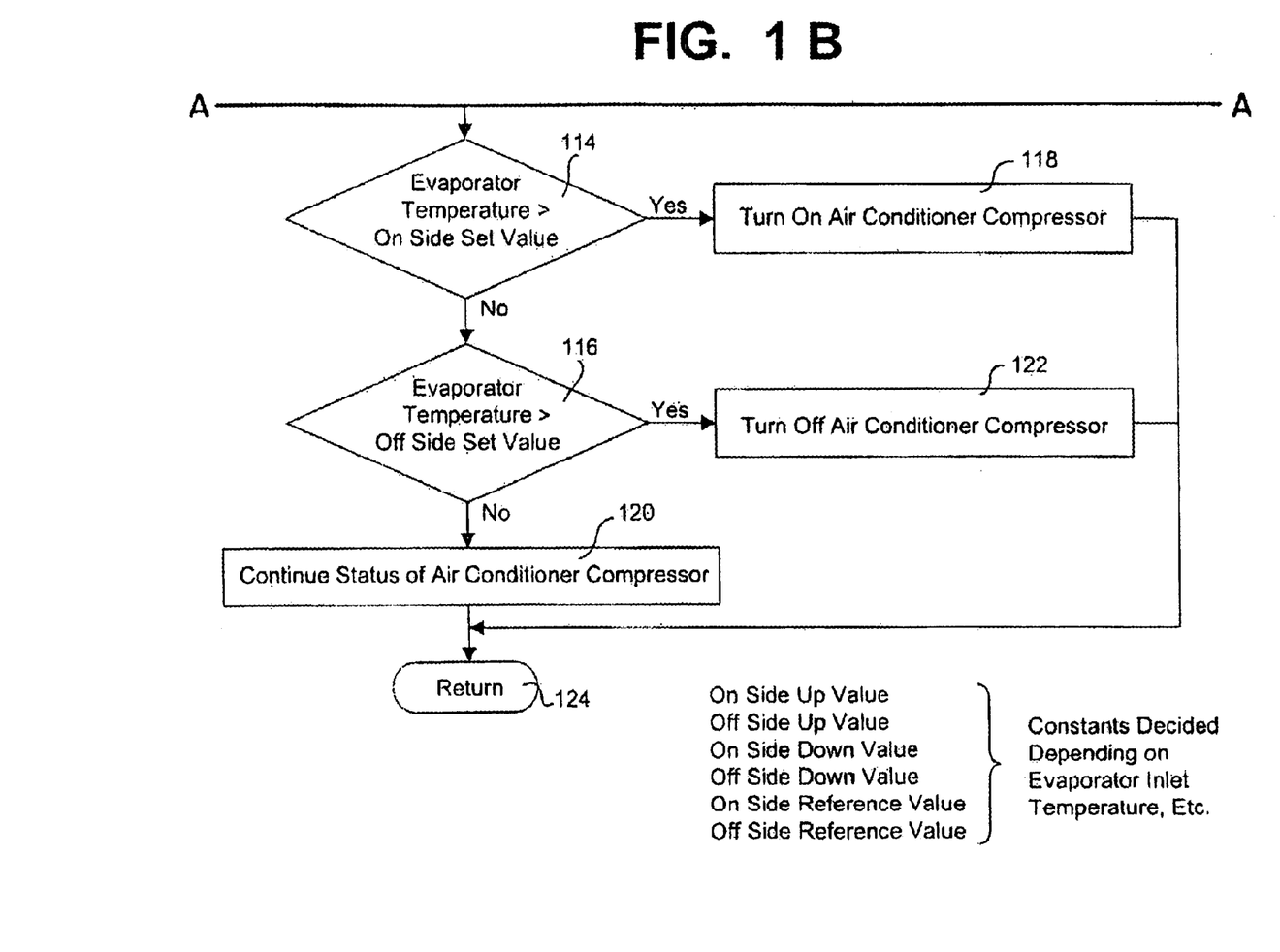
Figure 2:
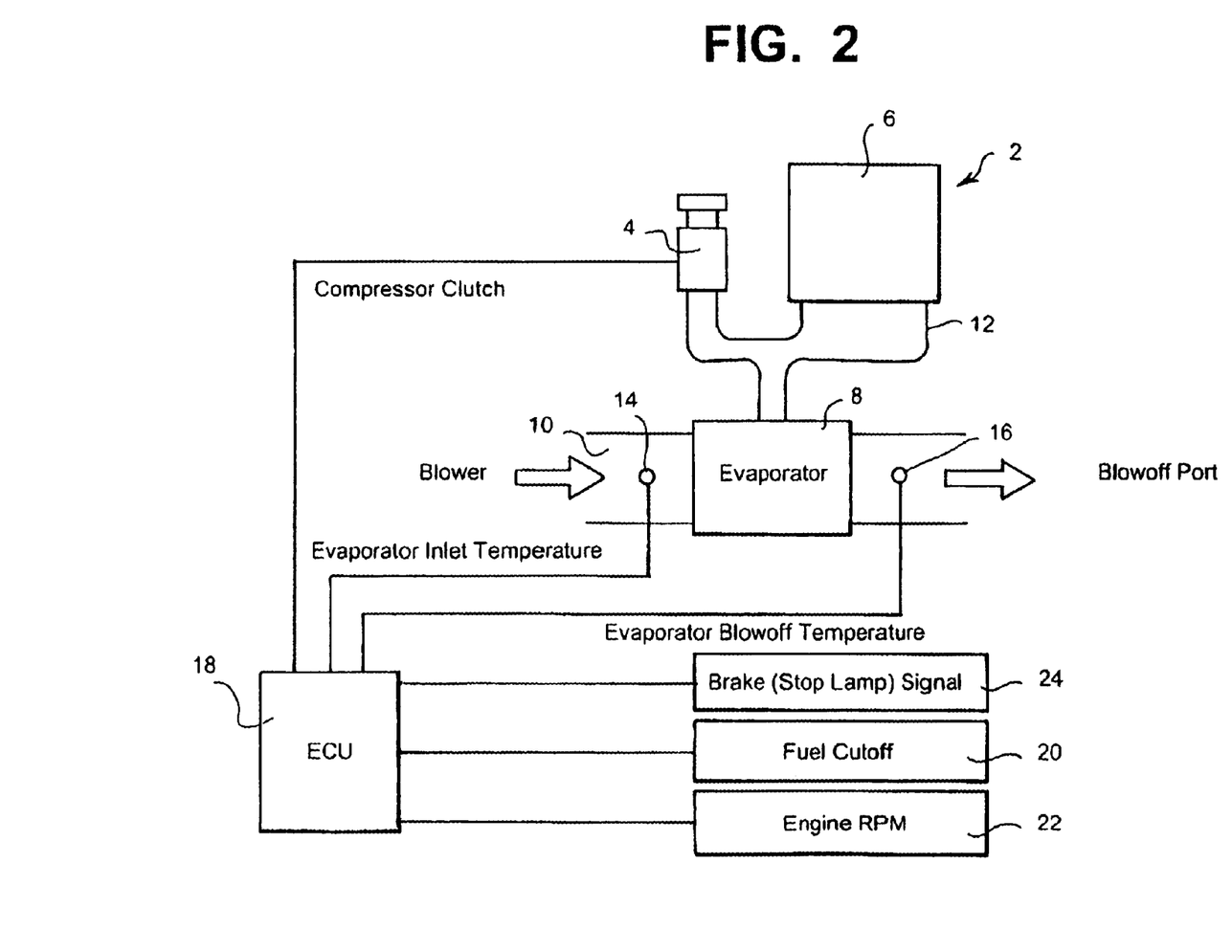
FIG. 2 is a system block diagram of a controller for a vehicle air conditioner according to an embodiment of the invention.

FIGS. 1A and 1B to 6 illustrate one embodiment of the present invention. Referring to FIG. 2, numeral 2 denotes an air conditioner in a vehicle (not shown).

The air conditioner 2 comprises at least a compressor 4 driven by an engine (not shown), a condenser 6, and an evaporator 8.

More specifically, as shown in FIG. 2, the evaporator 8 is located midway in an air conditioning passage 10 that is in communication at the upstream side with a blower (not shown) and at the downstream side with a blowoff port (not shown). The compressor 4, the condenser 6, and the evaporator 8 are interconnected by a coolant passage 12.

An evaporator inlet temperature sensor 14 is disposed in the air conditioning passage 10 at a position upstream of the evaporator 8, and an evaporator blowoff temperature sensor 16 is disposed in the air conditioning passage 10 at a position downstream of the evaporator 8. A control unit 18 is provided which calculates an evaporator temperature setting based on the evaporator inlet temperature from the evaporator inlet temperature sensor 14, and which controls the blowoff temperature in accordance with the calculated evaporator inlet temperature.

A fuel cutoff control unit 20 capable of stopping the supply of fuel, an engine rpm detecting unit 22, and a brake signal detecting unit 24 are each connected to the control unit 18.

Figure 6:
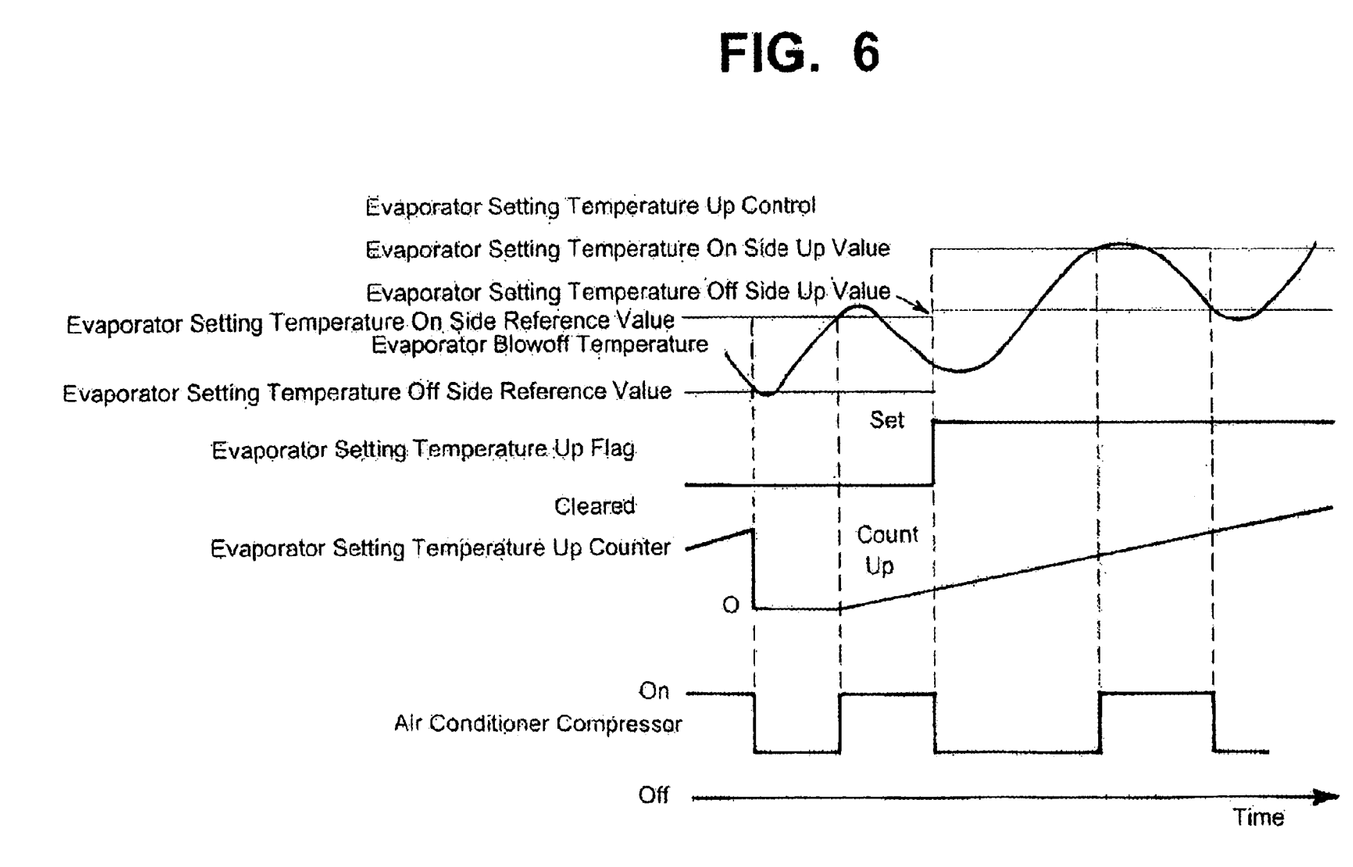
FIG. 6 is a graph showing various parameters over a period of time during an operating mode when the evaporator temperature setting is raised.

In that arrangement, the control unit 18 can also up-control or raise the evaporator temperature setting during fuel cutoff when a change of the engine rpm within any certain time is greater than a predetermined value, and when the brake signal is not detected. In other words, when a change of engine rpm is less than a predetermined value a and the brake signal is not detected by the brake signal detecting unit 24 during a fuel cutoff operation by the fuel cutoff control unit 20, the control unit 18 raises the evaporator temperature setting. More specifically, in the up-control operation to raise the evaporator temperature setting, the control unit 18, as shown in FIG. 6, increases an evaporator temperature setting ON-side reference value and an evaporator temperature setting OFF-side reference value to an evaporator temperature setting ON-side up-value and an evaporator temperature setting OFF-side up-value, respectively, for temporarily stopping the compressor 4.

The control unit 18 also can stop the up-control to raise the evaporator temperature setting when a continuous control time exceeds a predetermined value in the up-control. More specifically, for that purpose, a counter is provided to limit a flag duration time. The control unit 18 stops the up-control when the count of an up-flag counter representing the continuous control time exceeds a predetermined value b.

If a brake-ON duration time is less than a setting time c even when the brake signal is detected by the brake signal detecting unit 24, the control unit 18 performs the up-control to raise the evaporator temperature setting.

The control unit 18 additionally can perform down-control to drop the evaporator temperature setting when fuel cutoff is executed, a change of the engine rpm within any certain time is greater than a predetermined value, and/or the brake signal is detected for a certain time. In other words, when a change of engine rpm is less than the predetermined value a, the brake signal is detected by the brake signal detecting unit 24, and/or a brake-ON duration time is longer than a predetermined time c during a fuel cutoff operation by the fuel cutoff control unit 20, the control unit 18 drops the evaporator temperature setting, thereby forcing the compressor 4 to temporarily operate.

The control process for selecting the evaporator temperature setting in the controller for the vehicle air conditioner 2 is described below in more detail with reference to the flowchart, shown in FIGS. 1A and 1B. First, when an evaporator temperature setting selecting program is started (102), the ECU determines (104) whether an evaporator temperature up-flag is set. If the result of this determination (104) is NO, the ECU proceeds to determine (106) whether an evaporator temperature down-flag is set. If the result of the determination (104) is YES, the ECU proceeds to a set (108) an evaporator temperature setting ON-side set value and an evaporator temperature setting OFF-side set value to the evaporator temperature setting ON-side up-value and the evaporator temperature setting OFF-side up-value, respectively.

If the result of determination (106) is NO, the ECU proceeds to set the evaporator temperature setting ON-side set value and the evaporator temperature setting OFF-side set value to the evaporator temperature setting ON-side reference value and the evaporator temperature setting OFF-side reference value, respectively. If the result of determination (106) is YES, the ECU proceeds to set evaporator temperature setting ON-side set value and the evaporator temperature setting OFF-side set value to an evaporator temperature setting ON-side down-value and an evaporator temperature setting OFF-side down-value, respectively.

After each step (108), (110) or (112), the ECU determines (114) whether the evaporator temperature is equal to or higher than the ON-side set value. If the result of determination (114) is NO, the ECU proceeds to determine (106) whether the evaporator temperature is equal to or higher than the ON-side set value, and to determine (116) whether the evaporator temperature is lower than the OFF-side set value.

If the result of determination (114) is YES, the ECU turns on the air-conditioner compressor 4 (118).

If the result of determination (116) is NO, the air-conditioner compressor 4 remains in its preset state (120).

If the result of the determination (116) is YES, the ECU turns off of the air-conditioner compressor 4 (122).

After each air conditioner compression step (118), (120) or (122), the control process is returned (124) to start.

Figure 3:
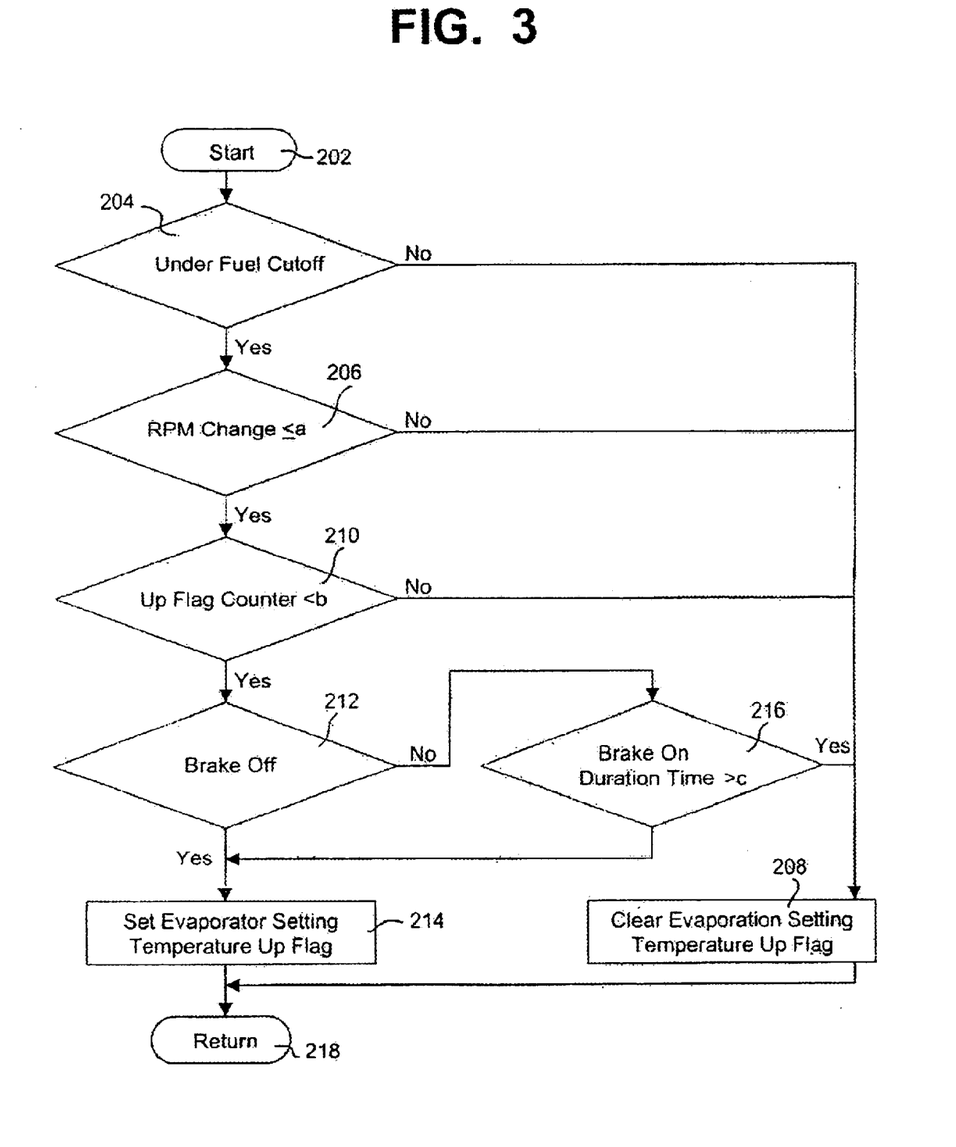
FIG. 3 is a flowchart of a process for generating an evaporator temperature setting up-flag according to an embodiment of the invention.

The control process will now be described with reference to a flowchart for the evaporator temperature up-flag (see FIG. 3). When a program for the evaporator temperature up-flag is started (202), the ECU determines (204) whether the fuel cutoff operation is executed by the fuel cutoff control unit 20. If the result of determination (204) is YES, the ECU determines (206) whether the change of the engine rpm is less than or equal to the predetermined value a. If the result of the determination (204) is NO, the ECU proceeds to clear (208) the evaporator temperature setting up-flag. If the result of determination (206) is NO, the ECU proceeds to clear (208) the evaporator temperature setting up-flag. If the result of determination (206) is YES, the ECU proceeds to determine (210) whether the count of the up-flag counter representing the continuous control time is less than the predetermined value b.

If the result of determination (210) is NO, the ECU proceeds to clear (208) the evaporator temperature setting up-flag. If the result of determination (210) is YES, the ECU proceeds to determine (212) whether the brake signal is not detected by the brake signal detecting unit 24, i.e., whether the brake is off.

If the result of determination (212) is YES, the ECU proceeds set (214) the evaporator temperature setting up-flag. If the result of determination (212) is NO, the ECU proceeds to determine (216) whether the brake-ON duration time detected by the brake signal detecting unit 24 is equal to or longer than the predetermined time c.

If the result of the determination (216) is YES, the ECU proceeds to clear (208) the evaporator temperature setting up-flag. If the result of the determination (216) is NO, the ECU sets (214) the evaporator temperature setting up-flag.

After setting (214) the evaporator temperature setting up-flag or clearing (208) the evaporator temperature setting up-flag, the control process is returned (218) to start.

Figure 4:
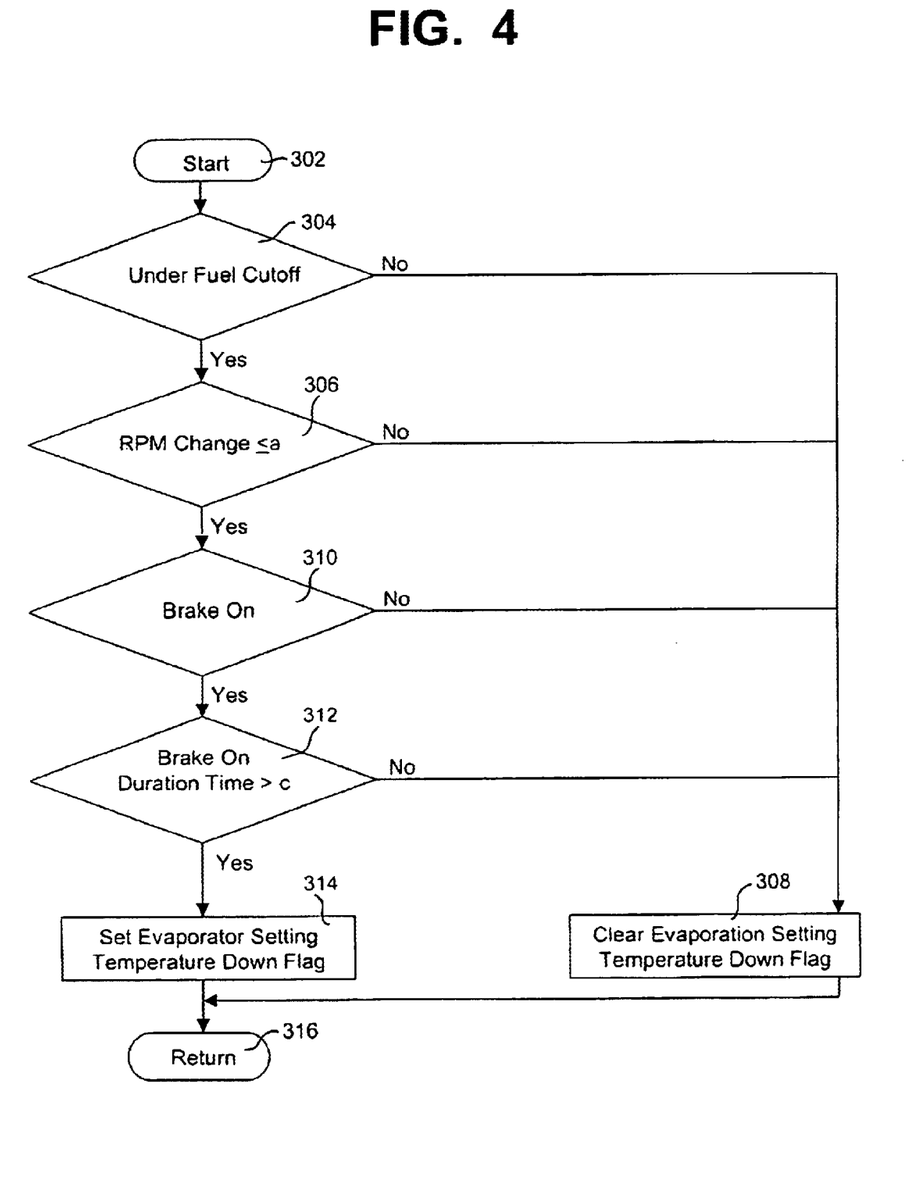
FIG. 4 is a flowchart of a process for generating an evaporator temperature setting down-flag according to an embodiment of the invention.

The control process will now be described with reference to a flowchart for the evaporator temperature down-flag (see FIG. 4).

When a program for the evaporator temperature down-flag is started (302), the ECU determines (304) whether the fuel cutoff operation is executed by the fuel cutoff control unit 20. If the result of determination (304) is YES, the ECU determines (306) whether the change of the engine rpm is less than or equal to predetermined value a. If the result of the determination (304) is NO, the ECU clears (308) the evaporator temperature setting down-flag.

If the result of determination (306) is NO, the ECU clears (308) the evaporator temperature setting down-flag. If the result of determination (306) is YES, the ECU determines (310) whether the brake signal is detected by the brake signal detecting unit 24, i.e., whether the brake is on.

If the result of determination (310) is YES, the ECU determines (312) whether the brake-ON duration time detected by the brake signal detecting unit 24 is equal to or longer than the predetermined time c. If the result of the determination (310) is NO, the ECU clears (308) the evaporator temperature setting down-flag.

If the result of determination (312) is NO, the ECU clears (308) the evaporator temperature setting down-flag. If the result of determination (312) is YES, the ECU sets (314) the evaporator temperature setting down-flag.

After setting (314) the evaporator temperature setting down-flag or clearing (308) the evaporator temperature setting down-flag, the control process is returned (316) to start.

Figure 5:
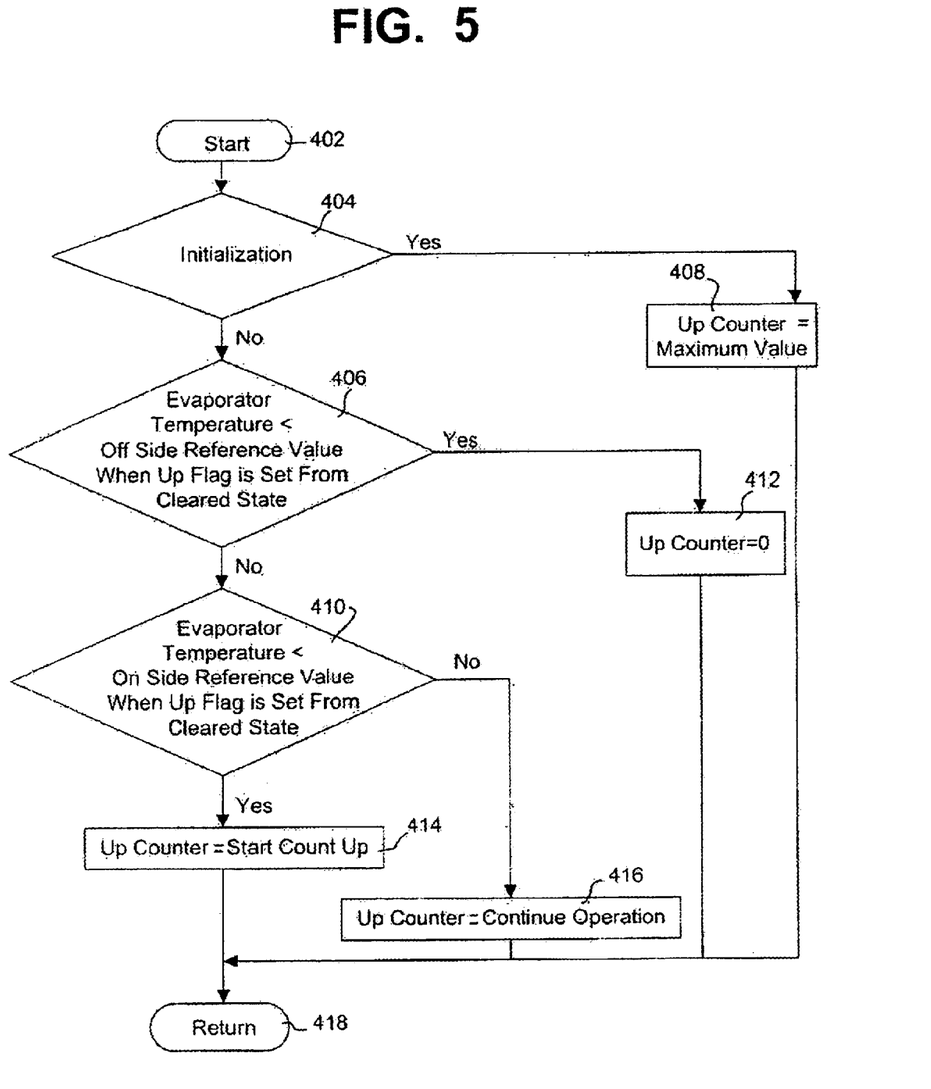
FIG. 5 is a flowchart of a process for generating for an up-flag counter according to an embodiment of the invention.

The control process will now be described with reference to a flowchart for the up-flag counter shown in FIG. 5.

When a program for the up-flag counter is started (402), the ECU determines (404) whether the up-flag counter is under initialization. If the result of determination (404) is NO, the ECU determines (406) whether the evaporator temperature is lower than the OFF-side reference value when the up-flag is set from a cleared state. If the result of determination (404) is YES, the ECU sets (408) the up-counter to a maximum value.

If the result of determination (406) is NO, the ECU determines (410) whether the evaporator temperature is equal to or higher than the ON-side reference value when the up-flag is set from a cleared state. If the result of determination (406) is YES, the ECU sets (412) the up-counter to 0 (zero).

If the result of determination (410) is YES, the ECU starts (414) count-up of the up-counter. If the result of determination (410) is NO, the ECU causes (416) the up-counter to continue the operation.

After the step (408), (412), (414), (416), the control process is returned (418) to start.

In the control process described above, when the fuel cutoff operation is executed by the fuel cutoff control unit 20, the change of engine rpm within any predetermined time is less than the predetermined value, and the brake signal is not detected by the brake signal detecting unit 24, the control unit 18 can raise the evaporator temperature setting and prolong the time during which the compressor 4 is stopped. This reduces the engine load and moderates vehicle deceleration. Furthermore, fuel cutoff time can be prolonged and fuel consumption can be reduced. This results in higher fuel economy and efficiency.

The control unit 18 also may stop the up-control to raise the evaporator temperature setting when the continuous control time exceeds the predetermined value in the up-control. Therefore, restrictions can be imposed on the continuous control time of the up-control, and a reduction in cooling capability can be prevented.

Further, when the fuel cutoff operation is executed by the fuel cutoff control unit 20, the change of engine rpm within any predetermined time is less than the predetermined value, and the brake signal is detected by the brake signal detecting unit 24 and continued for a certain time, the control unit 18 can drop the evaporator temperature setting. This drop of evaporator temperature setting allows the compressor 4 to operate for a longer time, thereby increasing engine braking power. It is, therefore, possible to reduce the rate of deceleration to be applied by foot braking for stopping or decelerating the vehicle and to prolong the life of brake pads.

The present invention is not limited to the above-described embodiment, but can be implemented in various manners and modified forms.

For example, while the on/off operation of the compressor may be controlled by changing the evaporator temperature setting value, the compressor may be turned on/off in direct response to flag-setting. In such a modification, however, other steps must be taken to prevent a reduction of cooling capability in a high-temperature state.

Further, the control unit may additionally perform up- or down-control to raise or lower the evaporator temperature setting according to various conditions. The control unit may also be designed to perform the additional functions of varying the evaporator temperature setting ON-side up-value, the evaporator temperature setting OFF-side up-value, the evaporator temperature setting ON-side down-value, and the evaporator temperature setting OFF-side down-value depending on a difference between the temperature in the vehicle compartment and the temperature of the outside air after the up-or down control. With this design, if the difference between the temperature in the vehicle compartment and the outside temperature is small, the compressor off time can be increased by increasing the evaporator temperature setting ON-side up-value, the evaporator temperature setting OFF-side up-value, the evaporator temperature setting ON-side down-value, and the evaporator temperature setting OFF-side down-value. If the difference between the temperature in the vehicle compartment and the outside temperature is large, the time during which the compressor is operated can be increased by decreasing the evaporator temperature setting ON-side up-value, the evaporator temperature setting OFF-side up-value, the evaporator temperature setting ON-side downvalue, and the evaporator temperature setting OFF-side down-value.

Consequently, the present design can advantageously stop the compressor and operate it at higher efficiency.

Accordingly, the present invention provides a controller for a vehicle air conditioner. The air conditioner comprises at least a compressor driven by an engine, a condenser, and an evaporator. The controller includes a control unit capable of controlling at least a blowoff temperature in accordance with an evaporator temperature setting calculated from an evaporator inlet temperature. The controller further includes a fuel cutoff control unit capable of stopping fuel supply, an engine rpm detecting unit capable of detecting engine revolutions per minute, and a brake signal detecting unit capable of detecting a brake signal. The control unit can additionally act as an up-control to raise the evaporator temperature setting when fuel cutoff operation is executed by the fuel cutoff control unit, a change of the engine rpm within any certain time is less than a predetermined value, and the brake signal is not detected by the brake signal detecting unit. Therefore, the control unit can raise the evaporator temperature setting and prolong the time during which the compressor is off. This effectively reduces the engine load and moderates a vehicle deceleration speed. Further, the fuel cutoff time can be prolonged and the fuel consumption can be reduced, thus resulting in higher economical efficiency.

The present invention also provides controller for the vehicle air conditioner described above that includes a control unit capable of controlling at least a blowoff temperature in accordance with an evaporator temperature setting calculated from an evaporator inlet temperature, a fuel cutoff control unit capable of stopping supply of fuel, an engine rpm detecting unit capable of detecting engine revolutions per minute, and a brake signal detecting unit capable of detecting a brake signal, and which can down-control or drop the evaporator temperature setting when fuel cutoff operation is executed by the fuel cutoff control unit, a change of the engine rpm within any predetermined time is less than a predetermined value, and the brake signal is detected by the brake signal detecting unit and continued for a certain time. Therefore, the control unit can lower the evaporator temperature setting. A drop of the evaporator temperature setting allows the compressor to operate for a longer time, and thereby increase the engine braking power. It is, therefore, possible to reduce the rate of deceleration to be applied by foot braking for stopping or decelerating the vehicle and to prolong the life of the brake pad.

What is claimed is:

1. A controller for a vehicle air conditioner having an engine-driven compressor, a condenser, and an evaporator, said controller comprising:

a control unit capable of controlling a blowoff temperature in accordance with an evaporator temperature setting calculated from an evaporator inlet temperature;

a fuel cutoff controller capable of stopping a supply of fuel to said engine;

an engine rpm detector capable of detecting engine revolutions per minute; and a brake signal detector capable of detecting a brake signal;

wherein said control unit is adapted to raise the evaporator temperature setting when said fuel cutoff controller executes fuel cutoff operation, the engine rpm detector detects a change of the engine rpm within a predetermined period of time that is less than a predetermined value, and said brake signal detector does not detect a brake signal.

2. A controller as defined in claim 1, wherein said control unit is further adapted to cease raising said evaporator temperature setting when the time during which said evaporator temperature setting has been raised exceeds a predetermined value.

3. A controller as defined in claim 1, wherein said control means is further adapted to cease raising the evaporator temperature setting when the time during which said evaporator temperature setting has been raised exceeds a predetermined value.

4. A controller for a vehicle air conditioner having an engine-driven compressor, a condenser, and an evaporator, said controller comprising:

control unit capable of controlling a blowoff temperature in accordance with an evaporator temperature setting calculated from an evaporator inlet temperature;

a fuel cutoff controller capable of stopping a supply of fuel to said engine;

an engine rpm detector capable of detecting engine revolutions per minute; and a brake signal detector capable of detecting a brake signal;

wherein said control unit is adapted to lower the evaporator temperature setting when said fuel cutoff controller executes fuel cutoff operation, said engine rpm detector detects a change of the engine rpm within a predetermined period of time that is less than a predetermined value, and said brake signal detector detects a brake signal that is continued for a predetermined period of time.

5. A controller for a vehicle air conditioner having an engine-driven compressor, a condenser, and an evaporator, said controller comprising:

control means capable of controlling a blowoff temperature in accordance with an evaporator temperature setting calculated from an evaporator inlet temperature;

a fuel cutoff control means capable of stopping a supply of fuel to said engine;

an engine rpm detecting means capable of detecting engine revolutions per minute; and a brake signal detecting means capable of detecting a brake signal;

wherein said control means is adapted to raise the evaporator temperature setting when said fuel cutoff control means executes a fuel cutoff operation, the engine rpm detecting means detects a change of the engine rpm within a predetermined period of time that is less than a predetermined value, and said brake signal detecting means does not detect a brake signal.

6. A controller for a vehicle air conditioner having an engine-driven compressor, a condenser, and an evaporator, said controller comprising:

control means capable of controlling a blowoff temperature in accordance with an evaporator temperature setting calculated from an evaporator inlet temperature;

a fuel cutoff control means capable of stopping a supply of fuel to said engine;

an engine rpm detecting means capable of detecting engine revolutions per minute; and a brake signal detecting means capable of detecting a brake signal;

wherein said control means is adapted to lower the evaporator temperature setting when said fuel cutoff control means executes a fuel cutoff operation, said engine rpm detecting means detects a change of the engine rpm within a predetermined period of time that is less than a predetermined value, and said brake signal detecting means detects a brake signal that is continued for a predetermined period of time.

* * * * *